Oct. 16, 1956 W. M. RUST, JR 2,767,388
METHOD OF PRESENTING SEISMIC INFORMATION
Filed Jan. 22, 1954 2 Sheets-Sheet 1
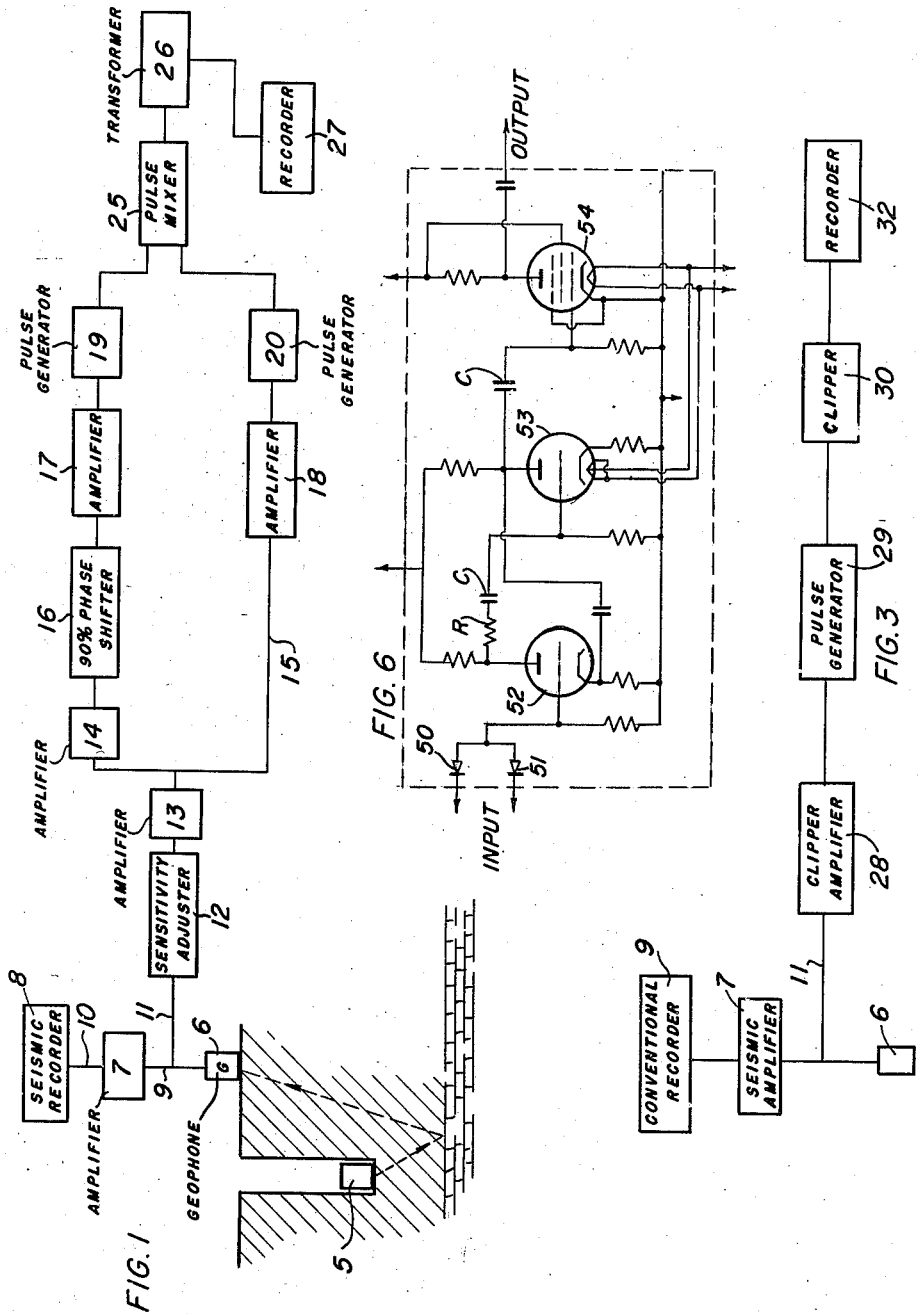
INVENTOR.
William M. Rust Jr.,
BY Melvin F. Fincke
ATTORNEY.

Oct. 16, 1956  W. M. RUST, JR  2,767,388
METHOD OF PRESENTING SEISMIC INFORMATION
Filed Jan. 22, 1954  2 Sheets-Sheet 2
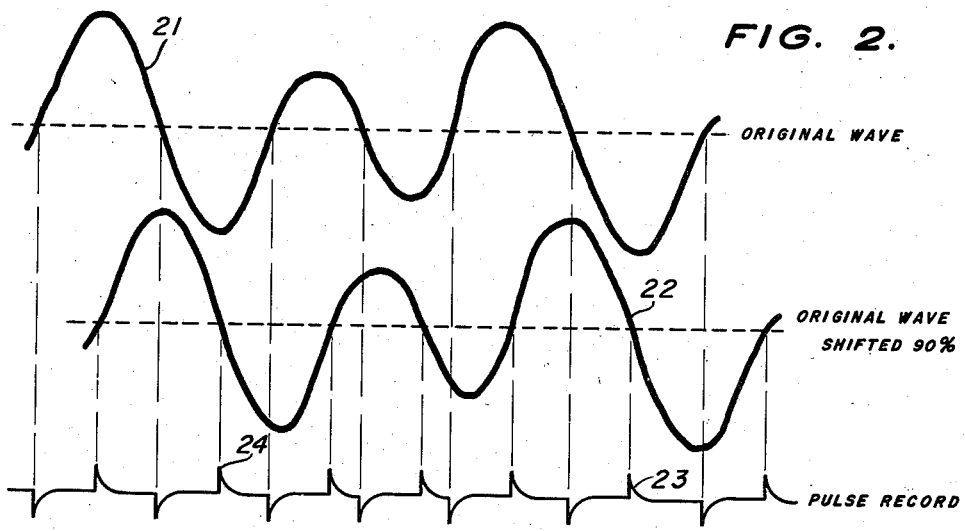
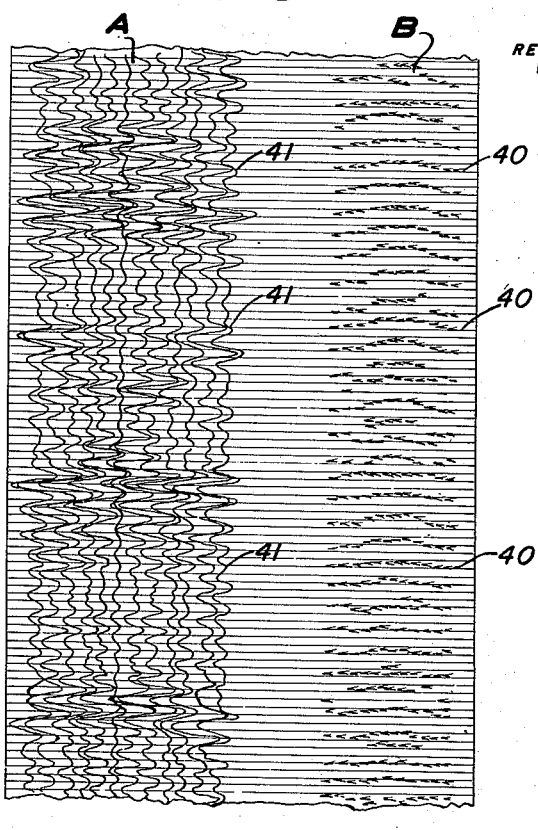
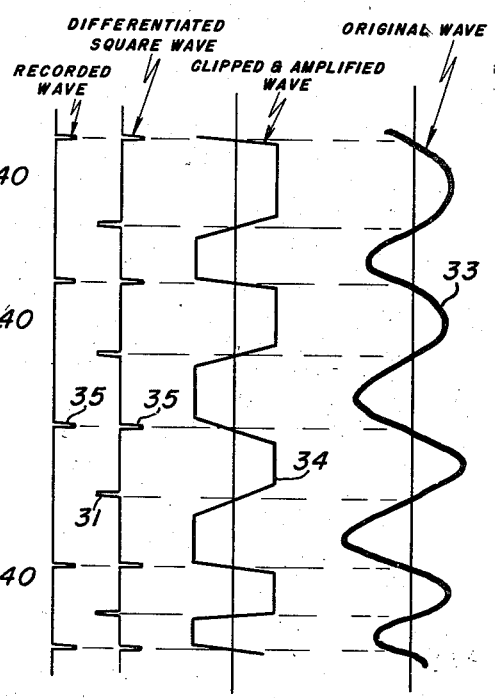
INVENTOR.
William M. Rust Jr.
BY
ATTORNEY.

United States Patent Office 2,767,388
Patented Oct. 16, 1956

2,767,388

METHOD OF PRESENTING SEISMIC INFORMATION

William M. Rust, Jr., Houston, Tex., assignor, by mesne assignments, to Esso Research and Engineering Company, Elizabeth, N. J., a corporation of Delaware Application January 22, 1954, Serial No. 405,594

9 Claims. (Cl. 340—15)

This invention relates to a method of investigating subsurface formations. More particularly, this invention relates to a new and novel method of recording electric signals generated by geophones utilized in seismic exploration.

It is a well-known physical principle that when an elastic wave is incident on the boundary surface between two media of different density and elastic properties, some of the wave energy is reflected. This principle of reflection has been utilized for some time in the exploration of subsurface formations. Current methods of recording reflected wave energy involve producing an electrical signal indicative of the character of the ground motion occasioned by the detonation of an explosive charge. Geophones are positioned at certain distances away from the source of the seismic waves and when the seismic wave energy impinges upon the geophones, the geophones produce electrical signals which are indicative of the character of the ground motions. These electrical signals oscillate about a no-signal or quiescent point. It is often difficult to identify the portion of the electric signal produced by reflected energy. It is customary to attempt to facilitate the identification of the reflected energy by altering the original signal by means of electrical filters.

It is a well-known principle in information and communication practice and methods that the original electrical signal can be altered and changed by filtering or otherwise but such changes may seriously decrease the amount of information present in the modified electrical signal.

It is an object of this invention to provide a method and means for presenting geophysical data by altering the form of the original electrical signal generated so as to facilitate the identification of reflected seismic energy with a minimum loss of information contained in the original signal.

Because the changes in elastic properties between adjacent beds may be either large or small, the amount of reflected energy may vary over wide limits. In the conventional oscillographic presentation of the data, it may be difficult or even impossible to identify small reflections occurring shortly after larger reflections. It is an object of my invention to solve this problem by eliminating the effects of variation in amplitude.

Maladjustment of equipment or the occurrence of localized areas with abnormal velocities may introduce small but serious errors in the time of arrival of the reflected energy at the individual geophones. With the conventional type of record these errors are difficult to detect. A further object of this invention is to provide a method of readily detecting such errors.

Briefly described, my invention consists of a method of presenting seismic data comprising the steps of creating seismic waves, detecting and converting the seismic waves into electrical signals and recording a special function of said electrical signals over a certain time interval. The recorded special function of the electrical signals may be obtained in several ways. For example, the original wave may be used to actuate a pulse generator at the quiescent points of the signals and at the peak points of the signals. By "quiescent" points, is meant the points at which no voltage is being received by the recorder. If desired the pulse generated might occur at either the peak points or the quiescent points to the exclusion of the other. Another method of generating the pulses is to use a clipper amplifier to generate square waves with said square waves having the same quiescent points as the original signals and then differentiating the square waves to obtain a pulse which occurs at the quiescent points. Various electronic apparatus are available for generating these different types of pulses.

Fig. 1 illustrates in block diagram an electronic system which can be used in the practice of my new method;

Fig. 2 shows examples of the original electrical signal, the original signal shifted in phase by 90° and the pulse record received by my new method as practiced by the system of Fig. 1;

Fig. 3 shows in block diagram a second system for practicing my new method;

Fig. 4 shows the wave forms obtained by utilizing the system shown in Fig. 3;

Fig. 5 is a tracing of an actual record showing the record obtained by my new method as compared to a conventional seismogram; and Fig. 6 is an electrical circuit diagram of a pulse generator which can be utilized in carrying out my new method of presenting seismic information.

Referring more particularly to the drawings, numeral 5 represents a means for creating seismic waves. This means may be a buried charge of dynamite, as shown in Fig. 1, which will set up seismic waves when exploded. The dynamite can be set off above the surface of the earth or the seismic waves can be created by other means such as an elevated weight which will produce the same effect when dropped on the earth. When the source of seismic waves is activated, the wave will be generated from the source and some of the waves will be reflected when the waves impinge upon a boundary surface between two media of different density and elastic properties. The direct and reflected seismic waves are "picked up" by means of a geophone 6. In Fig. 1 only one geophone is shown and one system for carrying out my new method is shown but it is understood that any number of geophones may be used for each system or a different system utilized with each geophone. The geophone 6 may be any type of geophone such as the displacement type geophone or a pressure-sensitive type of geophone. As is well known, a geophone has the property of generating electrical signals which duplicate the character of the seismic waves. These generated electrical signals oscillate about a quiescent line. In conventional seismic recording, the electrical signals generated from the geophone 6 are amplified by seismic amplifier 7 and then recorded by seismic recorder 8. In practicing my new method, I not only record the conventional seismic record but also record a function of said electrical signals over the same time interval. By comparing the conventional seismic record with the recorded function of said electrical signals over the same time interval, information as to the location of subsurface strata may be obtained under some circumstances which are not evident on the seismic record alone. If desired, the recording of the conventional seismic waves may be eliminated entirely and substantially the same amount of information or under some circumstances more useful information may be obtained by recording only the function of the original signal. This new method has been found particularly useful in obtaining information about very deep strata from reflected waves which would be obscure in the conventional seismogram as they would be largely attenuated in traveling over such a long distance. This is so because my new method and system produces a pulse which is controlled only by the occurrence of the quiescent state or peak and is not influenced by amplitude changes as is the case with conventional recording.

As shown in Fig. 1 the means for abstracting and recording a function of the original signal is electrically associated with the means for recording the conventional seismogram. The electrical signal generated by the geophone 6 is transmitted to the seismic amplifier 7 and the seismic recorder 8 by means of conductors 9 and 10. Connected to the conductor 9 by means of conductor 11 is a sensitivity adjuster 12. The electrical signal is amplified by means of amplifier 13 and the output of the amplifier 13 is used to supply driving voltage to each of two channels 14 and 15. Both of the channels 14 and 15 conduct an electrical signal of the same wave form as generated by geophone 6. However, positioned in channel 14 is a phase shifter or differentiator 16. The phase shifter shifts the phase of the original amplified signal by 90°. Hence it can be seen that the signal conducted in the channel 14 will have its quiescent point approximately 90° out of phase with the signal conducted through channel 15. The electrical signals are then further amplified by means of amplifiers 17 and 18 and then conducted to pulse generators 19 and 20. The pulse generator 20 is actuated by the original signal thereby producing a pulse at the instant the original signal is at quiescent state. Pulse generator 19 produces a pulse at each of the quiescent points of the shifted signal which is substantially equivalent to producing a pulse at the peak values of the original signal. Referring to Fig. 2, wave form 21 represents the type of electrical signal generated in a seismic recording system. Wave 22 shows wave 21 shifted by 90°. At 23 there is shown the pulses generated by the pulse generator. As can be clearly seen in Fig. 2 the pulses 24 occur at the quiescent points of the original wave and the shifted wave which is substantially equivalent to producing a pulse at both the quiescent points and the peak voltage points of the original wave. An experienced human computer can examine the pulses so generated either in conjunction with the original seismic record or without examining the original seismic record and determine the locations of various strata in the subsurface. The record as shown by numeral 23 of Fig. 2 is obtained by passing the pulses generated from pulse generators 19 and 20 through a pulse mixer 25 (Fig. 1). The pulse mixer consists of a pair of cathode followers each of which drives one end of the primary of output transformer 26. Applied to one grid are the pulses occurring at the quiescent points and to the other grid are applied the pulses generated at the peak points. Since pulses from the quiescent and peak channels do not arrive simultaneously, the action is that of lifting positively in potential one end or the other of the primary of the output transformer 26. By this means, pulses of the output transformer secondary will flow in one direction as the result of quiescent channel input and in the opposite direction as the result of peak channel input. The resultant pulses are recorded by recorder 27.

In Fig. 3 there is shown a second system for carrying out my new method. As previously described in reference to Fig. 1 a geophone 6, a seismic amplifier 7 and a conventional seismic recorder 9 record the electrical signals generated by the geophone 6. However, in this system, conductor 11 conducts the electrical signals to a clipper amplifier 28. The clipper amplifier very greatly amplifies the incoming electrical signals and clips off the upper curved portions of the signals to produce a square wave. The square waves are then differentiated by means of differentiator or pulse generator 29 to produce pulses at the beginning and end of the square wave. Under some circumstances the production of too many pulses might confuse a human computer. It would be desirable under such conditions to clip off some of the pulses thereby making the record more easily understood and the same amount of information can often be obtained as can be obtained from the record of the original pulses. Accordingly I provide in my system, as shown in Fig. 3, a clipper 30 for the purpose of clipping off the lower pulses 31, as shown in Fig. 4. The resultant pulses are recorded by means of recorder 32.

In Fig. 4 there is shown the electrical wave forms generated by the various components of Fig. 3. The original wave 33 is clipped and amplified by means of clipper amplifier 28 to produce the square waves 34. The square waves 34 are then differentiated by means of pulse generator 29 to produce pulses 31 and 35. The pulses 31 are then clipped off by means of clipper 30 and only the pulses 35 are recorded on the recorder 32.

In Fig. 5 there is shown a portion of an actual record taken with my new system. The record shows the traces at "B" of the pulses and at "A" the conventional seismogram utilizing 12 geophones. At 40 on the "B" record, the line up of the pulses clearly indicates the possible presence of adjacent beds having different elastic properties. The same signals on the "A" record, as shown by numeral 41, do not show any clear line and the reflections are obscured.

Fig. 6 shows an electrical circuit diagram of the pulse generator utilized in carrying out my new method. Pulse generators 19, 20 and 29 are substantially equivalent in their circuitry. To secure good timing accuracy, the input wave form is full-wave rectified by a pair of germanium diodes 50 and 51 to yield a wave form containing cusps or sharp points at the quiescent points of the input wave form. The negative output of the rectifier is applied to a first triode tube 52, operated as a high-gain voltage amplifier stage. Sufficiently large signals drive the triode tube 52 to a plate-current cut-off. A differentiating R.-C. coupling network applies the first derivative of the full-wave rectified wave form to the grid of a second triode tube 53, also operated as a high-gain voltage amplifier stage. A second differentiating circuit applies the second derivative of the full-wave rectified wave form to the grid of a gated-beam pentode tube 54 from the plate of which is obtained positive pulse output of constant amplitude and approximately one millisecond duration.

Various other modifications may be utilized for producing a signal which is a function of the original signal other than those shown in Figs. 1 and 3 and said embodiments shown in Figs. 1 and 3 are only illustrative and not intended to show all the possible embodiments. For example, in Fig. 1, if it is desired to obtain a pulse which occurs at either the peak voltage of the original waves or the quiescent voltage point of the original waves rather than a pulse occurring at both those positions, one of the channels 14 and 15 can be eliminated along with the pulse mixer 25 and the output transformer 26 and a function of the electrical signal will still be recorded on recorder 27. Also, if desired, a clipper amplifier such as shown in Fig. 3 at numeral 28 may be substituted in place of either pulse generator 19 or 20 so as to produce a different pulse shape on the record for the peak points than the pulse shape produced at the quiescent points thereby making the two points readily distinguishable.

In addition to the modifications which I have described other modifications within the scope of the subjoined claims will appear to those skilled in the art.

I claim:

1. A method of presenting geophysical data comprising the steps of creating seismic waves, detecting and converting said seismic waves into electrical signals, transforming said electrical signals into square waves having the same quiescent points as said electrical signals, producing electrical pulses by electrically differentiating said square waves and recording said electrical pulses.

2. A method of obtaining geophysical data comprising the steps of creating seismic waves, detecting and converting said seismic waves into electrical signals, producing secondary electrical signals comprising energy only at the quiescent and peak points on said electrical signals, and recording said secondary electrical signals.

3. A method of obtaining geophysical data comprising the steps of creating seismic waves, detecting and converting said seismic waves into electrical signals, producing secondary electrical signals comprising energy only at the quiescent points on said electrical signals, and recording said secondary electrical signals.

4. A method of obtaining geophysical data comprising the steps of creating seismic waves, detecting and converting said seismic waves into electrical signals, producing secondary electrical signals comprising energy only at the peak points on said electrical signals, and recording said secondary electrical signals.

5. In a system for presenting geophysical data, a geophone for detecting and converting seismic energy into electrical signals, a square wave generator electrically connected to said geophone and adapted to receive said electrical signals and produce square waves having the same quiescent points as said electrical signals and a pulse generator adapted to receive said square waves and produce a pulse at each quiescent point.

6. In a system for presenting geophysical data, a geophone for detecting and converting seismic energy into primary electrical signals, means electrically connected to said geophone for producing secondary electrical signals occurring in time only at the quiescent points of said primary electrical signals, and means for recording said secondary electrical signals.

7. A system in accordance with claim 6 wherein said means for producing secondary electrical signals is a pulse generator.

8. In a system for presenting geophysical data, a geophone for detecting and converting seismic energy into primary electrical signals, a 90° phase shifter electrically connected to said geophone for shifting the phase of said primary signals, a pulse generator electrically connected to said phase shifter for generating a pulse at the quiescent points of said shifted wave, and means for recording said pulses.

9. In a system for presenting geophysical data, a geophone for detecting and converting seismic energy into primary electrical signals, electricity conducting means connected to said geophone for conducting said primary electrical signals to two parallel electric systems, one of said systems including a pulse generator adapted to produce a pulse at each of the quiescent points of said primary signals, the other of said systems including a 90° phase shifter adapted to receive said primary electrical signals and shift the phase thereof by 90° and a pulse generator adapted to receive said shifted primary signals and produce a pulse at each of the quiescent points of said shifted primary signals, and means for recording the pulses produced by said two parallel electric systems.

References Cited in the file of this patent

UNITED STATES PATENTS

| | | |
|---|---|---|
| 2,161,764 | Minton | June 6, 1939 |
| 2,294,627 | Parr | Sept. 1, 1942 |
| 2,304,740 | Minton | Dec. 8, 1942 |
| 2,355,826 | Sharpe | Aug. 15, 1944 |
| 2,450,352 | Piety | Sept. 28, 1948 |
| 2,639,964 | Keinath | May 26, 1953 |
| 2,672,944 | Minton | Mar. 23, 1954 |